United States Patent [19]
Murata

[11] 3,871,591
[45] Mar. 18, 1975

[54] DEVICE FOR SIMULTANEOUSLY MANUFACTURING A PLURALITY OF FIBER BUNDLES

[75] Inventor: Rikizo Murata, Tokyo, Japan

[73] Assignee: Olympus Optical Company, Limited, Tokyo, Japan

[22] Filed: Sept. 17, 1973

[21] Appl. No.: 397,786

[30] Foreign Application Priority Data
Sept. 16, 1972 Japan .............................. 47-93091

[52] U.S. Cl. ................ 242/18 G, 156/174, 156/433, 350/96 B
[51] Int. Cl. ........................................... B65h 54/00
[58] Field of Search ...... 28/21; 242/18 G; 350/96 B; 156/432, 433, 174, 175

[56] References Cited
UNITED STATES PATENTS

| | | | |
|---|---|---|---|
| 3,580,775 | 5/1971 | Siegmund | 350/96 B |
| 3,588,221 | 6/1971 | Siegmund | 350/96 B |
| 3,592,398 | 7/1971 | Mukai | 242/18 G |
| 3,607,560 | 9/1971 | Peck | 156/433 |
| 3,741,839 | 6/1973 | Komiya | 156/174 |

*Primary Examiner*—Louis K. Rimrodt

[57] ABSTRACT

A device for simultaneously manufacturing a plurality of fiber bundles for use in fiberscopes comprises a number of pairs of slit forming plates arranged along two longitudinal rows perpendicular to a disk reel to which are secured these pairs of slit forming plates with the aid of a base plate extending perpendicular to the disk reel. These pairs of slit forming plates are detachably mounted on two longitudinal shafts which are slidably and rotatably supported by the base plate, whereby a desired gap is defined between each pair of slit forming plates.

4 Claims, 5 Drawing Figures

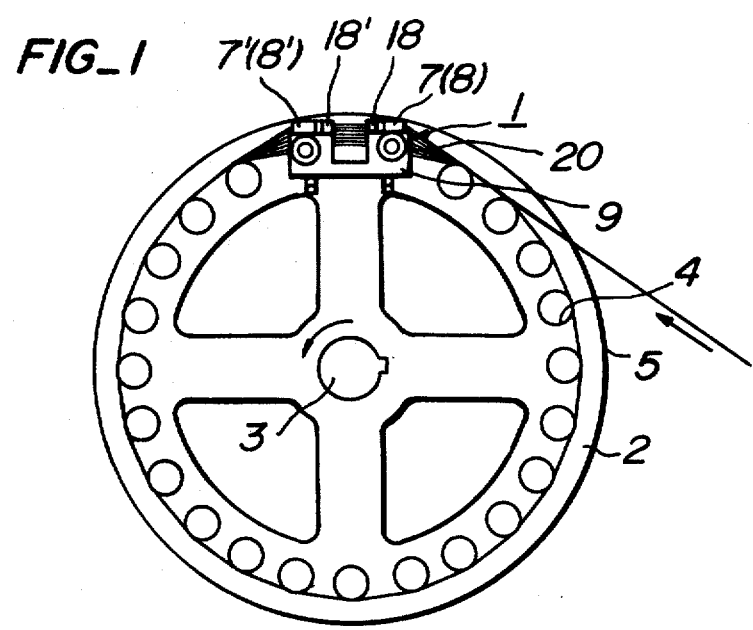

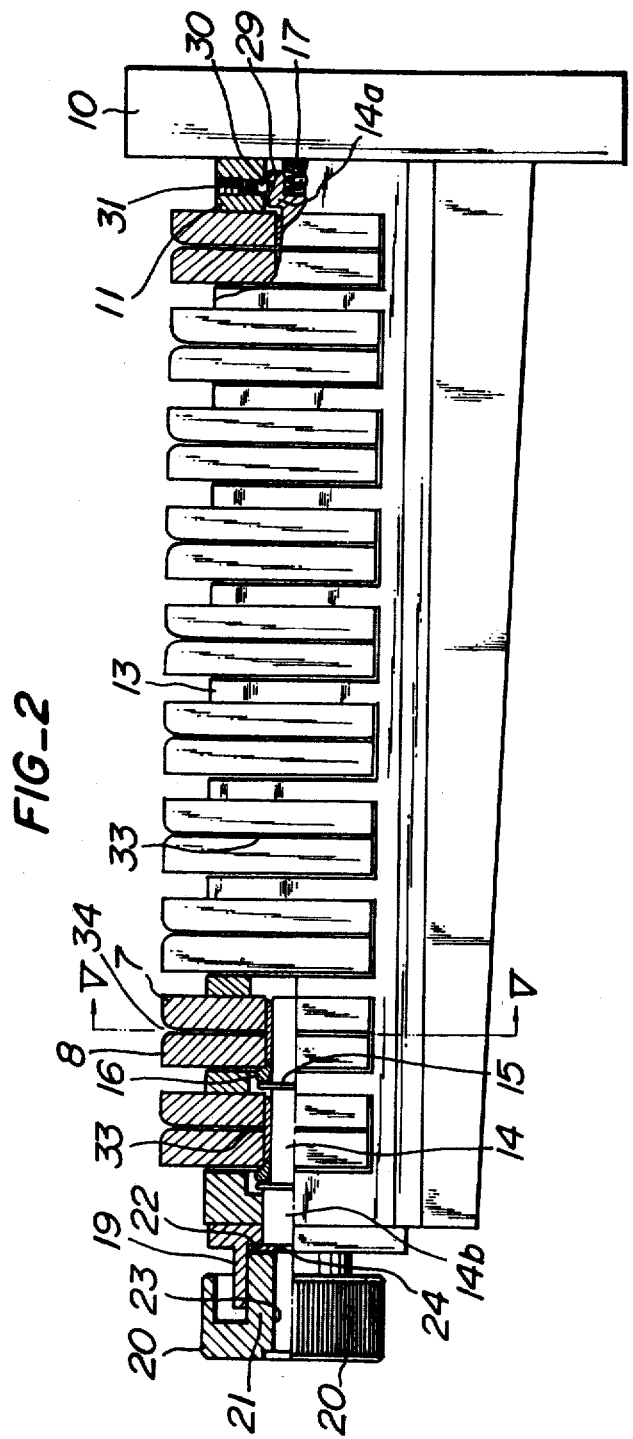

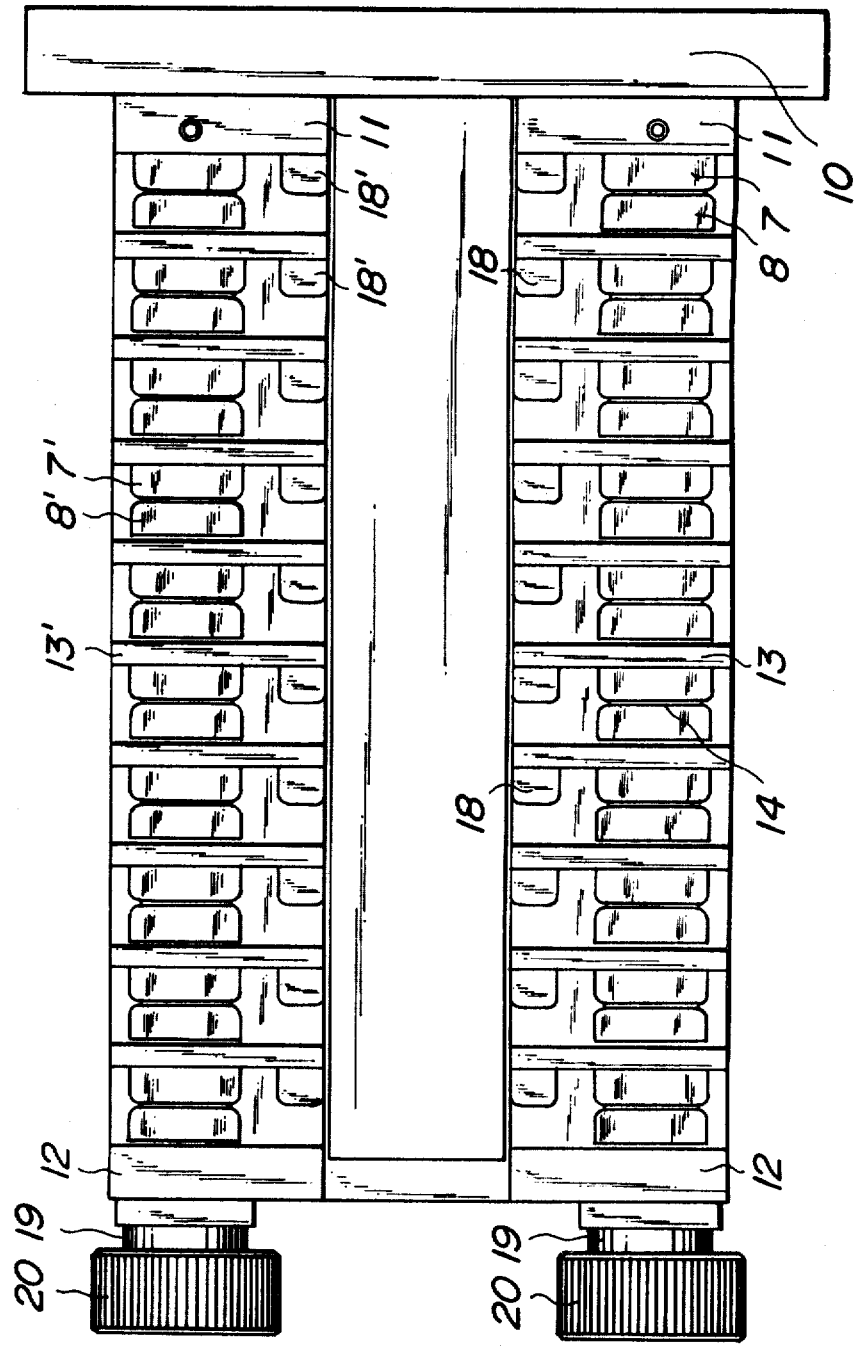

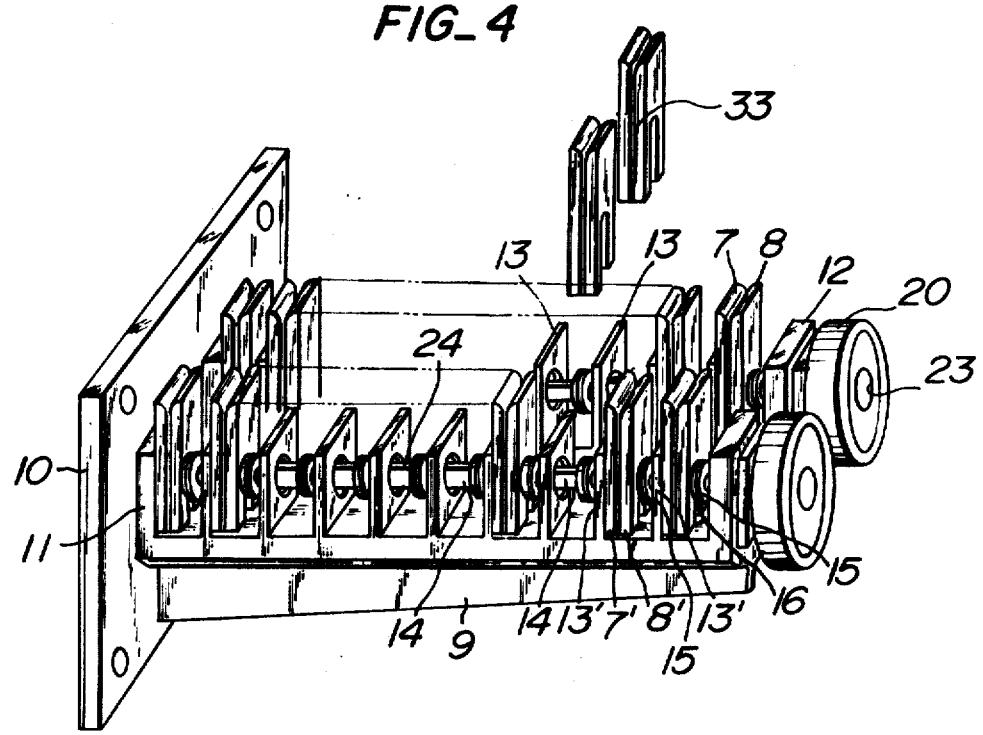
FIG_4
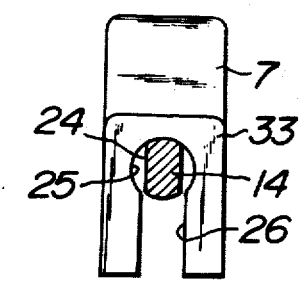
FIG_5

DEVICE FOR SIMULTANEOUSLY MANUFACTURING A PLURALITY OF FIBER BUNDLES

This invention relates to devices for manufacturing fiber bundles for use in fiberscopes of the type comprising a very large number of extremely small elongated light-conducting fibers such as glass fibers, etc., each having a diameter on the order of several microns to several hundreds microns and a large refractive index and coated with a light transparent material having a small refractive index, and more particularly to a device for simultaneously manufacturing a plurality of fiber bundles which can wind a series of continuous thread-like light conducting fibers upo a number of pairs of slit forming plates secured to a disk plate and arranged in two longitudinal rows which extend perpendicular to the disk plate and are separated one from the other along the outer periphery of the disk plate, each pair of slit forming plates of each row being separated one from the other along a rotary axis of the disk reel to form a plurality of fiber bundles each of which having a portion aligned in superimposed parallel relation with each other in one plane perpendicular to the rotary axis of the disk reel.

As devices for aligning and holding fibers, heretofore, it has been proposed to use a number of pairs of slit forming plates two plates of each pair are arranged in opposition and spaced one from the other to form a slit whose gap is slightly larger than the diameter of one fiber to be wound in which a fiber is wound into the slit in succession so as to be aligned and held in one plane by the slit and use a plurality of pins arranged along substantially one line and spaced one from the other and in which a fiber is threadedly engaged with the successive pins so as to be aligned and held by these pins in one curved plane.

One problem with the use of a number of pairs of slit forming plates is that a given slit gap must be strictly maintained such that the fibers can easily be inserted thereinto in a closely aligned superimposed relation, that the alignment of fibers is not disturbed therein, and that the slit gap must be precisely adjusted so as to be matched with various diameters of the fibers. The use of a plurality of pins makes it possible to omit the adjustment of pins in dependence with the various diameters of the fibers, but has the disadvantage that since the fiber passes along a curved path formed between a plurality of pins and hence the fiber is subjected to a tension, it is difficult to insert the fiber into the bottom of these pins, and as a result, a close contact of the fibers in succession is not obtained or a variation of the tension subjected to the fiber causes fibers wound later to ride over fibers wound previsouly, thereby disturbing the alignment of fibers.

An object of the invention is to provide an improved device for simultaneously manufacturing a plurality of fiber bundles which can easily and reliably adjust slit gaps to respective precise gaps corresponding to the diameters of fibers.

Another object of the invention is to provide such a device for simultaneously manufacturing a plurality of fiber bundles which is capable of holding fibers inserted into slit gaps in aligned superimposed relation in each pair of slit forming plates.

A further object of the invention is to provide such a device for simultaneously manufacturing a plurality of fiber bundles which can easily remove each pair of slit forming plate in case of replacement or cleaning thereof.

Another object of the invention is to provide such a device for simultaneously manufacturing a plurality of fiber bundles which is capable of easily removing a fiber bundle without disturbing the superimposed alignment of fibers or without breaking the fiber.

These and other desirable objects are attained, according to this invention, by an improvement on a device for simultaneously manufacturing a plurality of fiber bundles in which two vertical parallel plates are arranged in opposition and spaced apart by a given distance one from the other to form a pair of slit forming plates and a number of these pairs of slit forming plates are secured to a disk plate and arranged in two longitudinal rows which extend perpendicular to the disk plate and are separated one from the other along the outer periphery of the disk plate, each pair of slit forming plates of each row being separated one from the other along a rotary axis of the disk reel. The improvement consists in that between each pair of slit forming plates on each row is disposed a partition plate, that two longitudinal shafts are rotatably and slidably extended through the slit forming plates and the partition plates, that each pair of slit forming plates are detachably mounted on each longitudinal shaft, each longitudinal shaft is provided with an engaging member resiliently urged against one of each pair of slit forming plates, and that provision is made of means for axially moving the longitudinal shaft so as to urge through the engaging member each pair of slit forming plates against the partition plate.

In one embodiment of the invention, the longitudinal shaft is made rotatable and each pair of slit forming plates are detachably mounted on the longitudinal shaft at its one rotated position and are locked to the longitudinal shaft at its another rotated position.

In another embodiment of the invention, provision is made of an intermediate plate aligned with that slit forming plate which is in direct contact with the partition plate and the front surface of the intermediate plate is projected beyond the front surface of the above mentioned slit forming plate.

In another embodiment of the invention, between each pair of slit forming plates is detachably inserted a spacer so as to define a slit having a desired gap between each pair of slit forming plates.

In a further embodiment of the invention, the above mentioned means for moving the longitudinal shaft is comprised of a nut secured to one of end plates of the base plate and a knob threadedly engaged with the nut, whereby the rotation of the knob causes one end of the longitudinal shaft to be axially moved. It is preferable to provide an antirotation member between the knob and the corresponding shaft end of the longitudinal shaft which can move in lengthwise direction along the longitudinal shaft but cannot be rotated.

A preferred embodiment of the invention consists in a device for simultaneously manufacturing a plurality of fiber bundles comprising a disk reel, a base plate extending perpendicular to the disk reel and provided at its each end with an end plate, one of said end plates being secured through a mounting plate to the outside periphery of the disk reel, a number of partition plates arranged in two longitudinal rows between the end plates, each partition plate being secured to the base plate and spaced apart one from the other and the longitudinal rows being spaced apart each other along the outer periphery of the disk reel, two longitudinal shafts each slidably and rotatably supported along the longitudinal row by the end plates and extending through the partition plates, a number of pairs of slit forming plates, each pair being detachably mounted on each of the longitudinal shafts and inserted between the partition plates or between one of the partition plates and the end plate, a spacer sandwiched between each pair of slit forming plates and defining a slit having a desired gap, an intermediate plate secured to one of the slit forming plates and aligned with that slit forming plate which is contact with the partition plate and having a front surface projecting beyond the front surface of the above mentioned slit forming plate, an engaging member secured to the longitudinal shaft and engaged through a resilient member with one of each pair of slit forming plates, a spring inserted between one of the shaft ends and the mounting plate and urging the longitudinal shaft toward the other shaft end, means for axially moving the longitudinal shaft against the action of the spring toward one of the shaft ends to urge each pair of slit forming plates against corresponding partition plate, an anti-rotation member inserted between the means for axially moving the longitudinal shaft and the other shaft end, means for rotating the longitudinal shaft, means for holding the longitudinal shaft at a given rotated position, and means enabling each pair of slit forming plates to be detachably mounted on the longitudinal shaft.

The invention will now be described with reference to the accompanying drawings, in which:

FIG. 1 is a front view showing a device for simultaneously manufacturing a plurality of fiber bundles according to the invention mounted on a disk reel;

FIG. 2 is a side view showing a device for simultaneously manufacturing a plurality of fiber bundles according to the invention, partly in section;

FIG. 3 is a plan view of FIG. 2;

FIG. 4 is a perspective view of FIG. 2, partly broken away; and

FIG. 5 is a section along line V—V in FIG. 2.

Referring to FIG. 1, reference numeral 1 designates a device according to the invention as a whole. The device 1 is secured to one outside peripheral surface of a disk reel 2. The disk reel 2 is rotated by a rotary shaft 3. The disk reel 2 is provided along its one outside periphery with a plurality of rollers 4 extending perpendicular to the disk reel 2 and spaced apart one from the other. If the disk reel 2 is rotated by the rotary shaft 3, a series of continuous thread-like conducting fibers are wound upon the device 1 to form a plurality of fiber bundles 5.

The device 1 is provided with a number of pairs of slit forming plates 7, 8 and 7', 8' arranged along two longitudinal rows on a base plate 9 as shown in FIG. 4. The two rows are spaced apart one from the other along the periphery of the disk reel 5. The base plate 9 is provided at its each end with end plates 11, 12 and one of the end plates 11 is secured through a mounting plate 10 to the outside peripheral surface of the disk reel 2 by means of bolts, etc.

Between the end plates 11, 12 are arranged partition plates 13, 13' in parallel with the end plates 11, 12 and spaced apart one from the other to form a given space therebetween. The partition plates 13 on one row are precisely aligned with the partition plates on the other row. Between the two partition plates and between the partition plate and the end plate on each row are formed spaces into each of these spaces is inserted each pair of slit forming plates 7, 8 and 7', 8' with a slight gap remained therebetween. The mounting plate 10 and the partition plates 13, 13' may preferably be made integral with the base plate 9.

The slit forming plates 7, 8 and their slit adjusting and detachably mounting mechanism on one row are the same in construction as the split forming plates 7', 8' and their slit adjusting and detachably mounting mechanism on the other row so that the construction and function of the slit forming plates 7, 8 and their slit adjusting and detachably mounting mechanism on one row will now be described.

As shown in FIGS. 2 and 4, through holes formed in the two end plates 11, 12, partition plates 13 and slit forming plates 7, 8, respectively, is slidably and rotatably extended a longitudinal shaft 14 to which is secured or with which is made integral a collar 15. A suitable elastic member such as an O-ring 16 is fitted around the shaft 14 and made in contact with the collar 15. The O-ring 16 is made contact with one of each pair of slit forming plates 8.

The longitudinal shaft 14 is journaled at its both ends 14a, 14b by the end plates 11, 12. Between the shaft end 14a journaled by the end plate 11 and the mounting plate 10 is inserted a spring 17 for urging the longitudinal shaft 14 toward the left seen in FIG. 3 so as to release the thrust urged against each pair of slit forming plates 7, 8 mounted on the longitudinal shaft 14 between the two partition plates 13, 13 and between the partition plate 13 and the end plates 11, 12. To the partition plate 13 is secured an intermediate plate 18 aligned with one of the slit plates 7 as shown in FIG. 3. The front surface of the intermediate plate 18 is slightly projected beyond the front surface of the slit forming plate 7 for the purpose to be described later.

In the embodiment shown in the drawings, the engaging member resiliently brought into contact with one of each pair of slit forming plates 8 is comprised of the collar 15 which is made engagement through the resilient member such as the O-ring 16 with one side of one of each pair of slit forming plates 8. Various modifications of these engaging member and resilient member are possible. For example, as the resilient member use may be made of well known suitable coil springs, leaf springs and other resilient bodies.

To the other end plate 12 is secured a nut 19 which is threadedly engaged with a knob 20 for adjusting the gap between each pair of slit forming plates 7, 8. The knob 20 is provided at its rear side with a hollow cylindrical member 21 which is brought into engagement through an antirotation member 22 with the shaft end 14b. In the embodiment shown in the drawings, the antirotation member 22 is comprised of a ring which is engaged through a well known key-grooved connection with the inside wall of the nut 19 such that the knob 20 can axially be moved along the nut 19 but is prevented from being rotated.

As shown in FIG. 5, the longitudinal shaft 14 is provided at its each side with flat portions 24. Each pair of the slit forming plates 7, 8 is provided with a hole 25 which is slightly larger in diameter than the longitudinal shaft 14 and a groove 26 extending from the hole 25 to the lower end of each pair of slit forming plates 7, 8.

The groove 26 has its width which is substantially equal to the distance between the both respective flat portions 24, 24 of the longitudinal shaft 14. As a result, in the rotated position of the longitudinal shaft 14 shown in FIG. 5 each pair of slit forming plates 7, 8 may be engaged with and removed from the longitudinal shaft 14.

If the longitudinal shaft 14 engaged with each pair of slit forming plates 7, 8 is rotated from the position shown in FIG. 4 by 90°, each pair of slit forming plates 7, 8 are locked to the longitudinal shaft 14. A screw driver or other tools may be inserted from the outside into center holes 23, 24 formed in the hollow cylindrical member 21 of the knob 20 and antirotation member 22, respectively, and brought into engagement with a notch (not shown) formed at the shaft end 14b so as to rotate the longitudinal shaft 14. The other end 14a of the longitudinal shaft 14 is provided at its outer periphery with an indentation 29 against which is urged a ball 30 by means of a spring 31. The above described rotation of the longitudinal shaft 14 causes the ball 30 to be engaged with the indentation 29 whereby the rotation of the longitudinal shaft 14 can be stopped.

The assembling of the device 1 constructed as above described may be effected as follows. At first, the knob 20 is rotated so as to move it to the left in FIG. 2, and as a result the spring 17 causes the longitudinal shaft 14 to move to the left. Then, each pair of slit forming plates 7, 8 with a spacer 33 sandwiched therebetween are mounted on the longitudinal shaft 14 as shown in FIG. 5. The spacer 33 may be made of a metal foil or any other suitable foil-shaped material whose thickness is slightly larger than the diameter of a fiber to be wound. Then, the O-ring 16 is brought into engagement with one of the slit forming plates 8. Subsequently, the longitudinal shaft 14 is rotated by means of a driver (not shown) so as to lock each pair of slit forming plates 7, 8 to the longitudinal shaft 14. Then, the knob 20 is rotated so as to move it to the right in FIG. 2. Thus, the shaft end 14b of the longitudinal shaft 14 is subjected through the antirotation member 22 to a thrust which causes the longitudinal shaft 14 to move to the right against the action of the spring 17. In this case, the collar 15 secured to the longitudinal shaft 14 urges each pair of slit forming plates 7, 8 through the O-ring 16 against the partition plate 13 or against the end plate 11 to lock each pair of slit forming plates 7, 8 with a given slit 34 defined by the thickness of the spacer 33 sandwiched between each pair of slit forming plates 7, 8. The upper opposite edges of the slit 34 are made enlarged outwardly for ease of insertion of the fiber.

In case of winding the fiber, the fiber is inserted from the above into the slit 34 every time the disk reel 2 is rotated. The front surface of the intermediate plate 18 slightly projecting beyond the front surface of one of each pair of slit forming plates 7 serves to urge the fiber against the other slit forming plate 8, and as a result, the fibers successively inserted into each pair of slit forming plates 7, 8 are made in contact with the plate 8 and accurately superimposed upon each other in vertically aligned relation.

The fibers thus vertically aligned are adhered together by applying an adhesive material throughout limited areas inside each pair of slit forming plates 7, 8 and 7', 8', Then, the knob 20 is rotated so as to release the thrust subjected to each pair of slit forming plates, thereby easily removing the plurality of fiber bundles upwardly from the slit 34. Since the antirotation member 22 inserted between the knob 30 and the shaft end 14b serves to prevent the longitudinal shaft 14 and hence each pair of slit forming plates 7, 8 from being rotated, there is no risk of the fibers held between the slit 34 being subject to an abnormal tension and hence broken by the rotation of each pair of slit forming plates 7, 8.

In case of winding a fiber having a different diameter, the spacer 33 sandwiched between each pair of slit forming plates 7, 8 may be replaced by a spacer whose thickness corresponds to the different diameter of the fiber, and as a result, the gap of the slit 34 may easily and precisely be adjusted. In addition, each pair of slit forming plates 7, 8 detachably mounted on the longitudinal shaft 14 makes it possible to easily and reliably replace the spacer 33 and change and clean each pair of slit forming plates 7, 8 when they become deteriorated. Alternatively, the spacer 33 may be adhered to one of the slit forming plates and the other slit forming plate to be replaced may be provided with a step or projection so as to form a slit 34 whose gap corresponds to the diameter of the fiber to be wound.

What is claimed is:

1. A device for manufacturing a plurality of fiber bundles comprising a disk reel rotatably mounted on a rotary shaft; a base plate secured at its one end by a mounting plate to said disk reel and extending perpendicular to said disk reel and having at its each end an end plate; a number of parallel partition plates secured to said base plate and arranged between said end plates in two longitudinal rows and spaced apart one from the other, said two longitudinal rows being spaced apart from each other along the outer periphery of said disk reel; two longitudinal shafts slidably and rotatably supported by said end plates and extending through said parallel partition plates; a number of pairs of slit forming plates, each pair of slit forming plates being detachably mounted on each of said two longitudinal shafts; a spacer detachably sandwiched between said each pair of slit forming plates and having a thickness substantially larger than the diameter of a fiber to be wound; a resilient engaging member comprised of a collar integral with said longitudinal shaft and an elastic member fitted around said longitudinal shaft and in contact with one of each pair of said slit forming plates; a spring inserted between one of said shaft ends and said plate and urging said longitudinal shaft toward the other shaft end; and means for axially moving said shaft against the action of said spring and comprised of a nut secured to said end plate and a knob threadedly engaged with said nut, whereby said each pair of slit forming plates are urged against corresponding partition plates to form a slit with gap substantially larger than the diameter of one fiber and having wound therein fibers in superimposed relation.

2. A device for manufacturing a plurality of fiber bundles as claimed in claim 1, wherein said longitudinal shaft has at each side flat portions and said each pair of slit forming plates have a hole slightly larger in diameter than said longitudinal shaft and a groove extending from said hole to the lower end of said each pair of slit forming plates and having a width substantially equal to the distance between said flat portions, whereby said each pair of slit forming plates are detachably mounted on said longitudinal shaft when in one of two rotary positions and are locked to said longitudinal shaft when rotated from said position by 90°.

3. A device for manufacturing a plurality of fiber bundles as claimed in claim 1 and comprising further an intermediate plate secured to one of said partition plates and aligned with the slit forming plate which is in contact with said partition plate and having a front surface projecting substantially beyond the front surface of said slit forming plate.

4. A device for manufacturing a plurality of fiber bundles as claimed in claim 1 and comprising further an anti-rotation member arranged between said knob and one end of said shaft and comprised of a ring engaged throgh a key-groove connection with the inside wall of said nut, whereby said knob together with said longitudinal shaft are axially movable along said nut and nonrotatable.

* * * * *